United States Patent [19]

Griffith et al.

[11] 4,045,408

[45] Aug. 30, 1977

[54] FLUORO-ANHYDRIDE CURING AGENTS AND PRECURSORS THEREOF FOR FLUORINATED EPOXY RESINS

[75] Inventors: James R. Griffith, Riverdale Heights; Jacques G. O'Rear, Temple Hills, both of Md.

[73] Assignee: The United States of America as represented by the Secretary of the Navy, Washington, D.C.

[21] Appl. No.: 668,555

[22] Filed: Mar. 19, 1976

[51] Int. Cl.$^2$ .............................................. C08G 59/42
[52] U.S. Cl. ............................ 260/47 EA; 260/78.41; 260/346.3; 260/521 P; 252/182
[58] Field of Search ............ 260/2 EA, 47 EA, 78.41, 260/346.3, 521 P; 252/182

[56] References Cited

U.S. PATENT DOCUMENTS

| | | | |
|---|---|---|---|
| 3,281,426 | 10/1966 | Tiers | 260/314.5 |
| 3,899,517 | 8/1975 | Fletcher | 260/346.3 |

OTHER PUBLICATIONS

Griffith et al., "Fluoro-Anhydride Curing Agent", pp. 429-435 in Lieng-Huang Lee, "*Adhesion Sciences & Technology*", Plenum Publishing 1975.

*Primary Examiner*—Harold D. Anderson
*Assistant Examiner*—E. A. Nielsen
*Attorney, Agent, or Firm*—R. S. Sciascia; Philip Schneider; Thomas McDonnell

[57] ABSTRACT

Fluoro-anhydride curing agents for fluorinated epoxy resins, especially for highly fluorinated epoxy resins selected from the class consisting of hydroxyperfluoroalkyl phthalic anhydride, hydroxyperfluoroalkyl pyromellitic dianhydride, and mixtures thereof; a fluoro-anhydride curing agent for fluorinated epoxy resins that is the toluene-soluble mixture prepared by heating a hydroxyperfluoroalkyl benzenepentacarboxylic acid at about 240° C; precursors for all of the curing agents; and the epoxy resins prepared therefrom.

10 Claims, No Drawings

FLUORO-ANHYDRIDE CURING AGENTS AND PRECURSORS THEREOF FOR FLUORINATED EPOXY RESINS

BACKGROUND OF THE INVENTION

The present invention relates generally to synthetic resins and in particular to fluorinated epoxy resins.

The terminology pertaining to epoxy resins is varied. The term "epoxy" refers to the small ring grouping

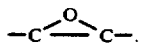

"Resin" refers to a number of physical properties of a material generally related to amorphous, sticky, soft, semifluid. Often an epoxy resin is prepared by copolymerizing an epoxy monomer with another monomer termed a "curing agent." Hence the term "epoxy resin" may be used to designate the epoxy component only, the epoxy-curing agent mixture before reaction, or the final polymer that results from the reaction. The term "fluorinated epoxy resin" does not mean that any of the components are actually reacted with fluorine or fluorinating agents except at the early precursor stages, but simply means the product resulting from the reaction of fluorinated materials. The term "catalyst" is used in the conventional sense, i.e., a material present in a small amount which alters the speed of reaction.

Highly fluorinated epoxy resins, on account of their superior strength, stability, and low surface energy, are extremely important today and are becoming even more important with the increasing need for paints, coatings, adhesives, and structures for harsh environments. Difficulties in the manufacture and use of these compounds, especially the resins prepared from highly fluorinated diglycidyl ethers, are caused by the known curing agents. The curing agents used in synthesizing epoxy resins are usually dianhydrides, e.g., pyromellitic dianhydride and amines, e.g. dimethylaminoethane. The defects associated with dianhydride curing agents are high melting points, e.g., the melting point of pyromellitic dianhydride is 286° C, very unaggressive reaction behavior with these epoxies, and a reduction of the fluorine content of the resin in comparison with the fluorinated epoxy monomer. While the amine curing agents react more readily, these compounds are not better in regards to the other two defects and these compounds are also objectionable due to the lower thermal stability and coloring of the resulting resins. The coloring is especially objectionable for resins which are used to fabricated sight glass tubes for boilers and evaporators and other types of windows. Fluorinated amines give some improvement. However these curing agents have several disadvantages which include poor long-term chemical stability, unaggressive reaction behavoir with respect to epoxies, and excessive cost factors. Attempts, until now, to prepare fluorinated anhydride curing agents have been unsuccessful.

SUMMARY OF THE INVENTION

It is therefore an object of this invention to provide a new class of epoxy curing agents.

Another object of this invention is to provide epoxy resins with greater fluorine content.

Another object of this invention is to provide transparent fluorinated epoxy resins.

A further object of this invention is to provide fluorinated epoxy resins with greater thermal stability.

A still further object of this invention is to provide cheaper and more reactive epoxy curing agents.

And another object of this invention is to provide a novel class of precursors of the epoxy curing agents.

These and other objects are achieved by the novel precursors and curing agents prepared by reacting polymethyl benzene with a perfluoroacetone, by oxidizing the resulting fluoro-substituted polymethyl benzene to the acid, and by heating the resulting acid to form the anhydride curing agent.

DETAILED DESCRIPTION OF THE INVENTION

The preparation of the novel acid precursors and the monoanhydride curing agents is as follows:

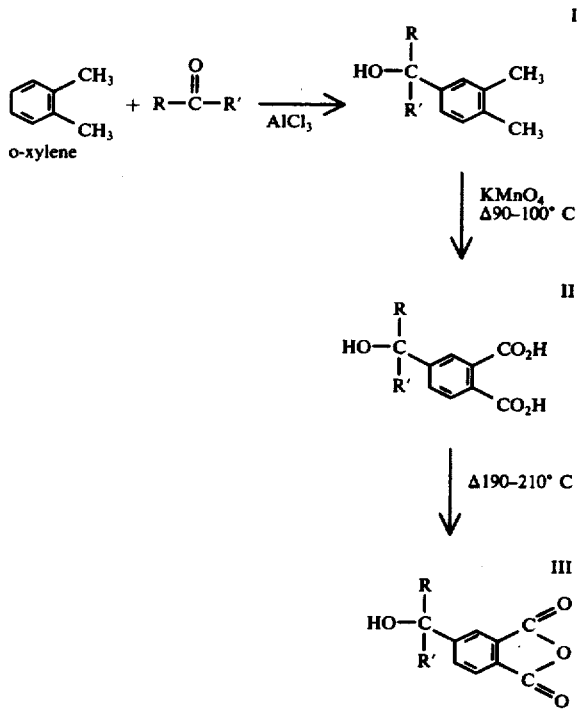

wherein R and R' may be $CF_3$, $C_2F_5$, or $C_3F_7$.

The following examples are given to demonstrate but not limit the above preparation. In these examples R and R' are both $CF_3$.

EXAMPLE 1

(2-Hydroxyhexafluoro-2-propyl)-3,4-dimethylbenzene, I.

This compound was prepared from o-xylene and hexafluoroacetone: bp 101°-102°/20.0 mm Hg; $N_D^{25}$ 1.4334; lit. (1) bp 200-200.5°/760 mm Hg.

EXAMPLE 2

4-(2-Hydroxyhexafluoro-2-propyl) phthalic acid, II.

A mixture of I(80.0 g; 0.294 mole), potassium permanganate (196 g; 1.24 moles) and 0.15 N aqueous sodium hydroxide solution (3000 ml) ws stirred and maintained at 90°-93° for 4 hours. The reaction mixture was cooled and filtered to remove manganese dioxide. The alkaline purple filtrate was acidified with 12 N hydrochloric acid (140 ml), decolorized with sodium sulfite, and the clear solution extracted with ether (2 × 1 ½ lbs.). The ether extract was dried ($MgSO_4$), filtered, the filtrate diluted with toluene (200 ml) and the resulting mixture concentrated at reduced pressure to a mass of white crystals. Dispersal of the white crystals in boiling toluene, followed by filtration of the cooled dispersions led to analytical white crystals of II: 86.5 g, 88.6% yield; mp 183°–185° Anal. Calcd. for $C_{11}H_6F_6O_5$: C, 39.77; H, 1.82; F, 34.31. Found: C, 39.94; H, 1.80; F, 34.46.

EXAMPLE 3

4-(2-Hydroxyhexafluoro-2-propyl) phthalic anhydride, III.

Compound II (43.00 g, 0.129 mole) was placed in a long neck flash (300 ml) and heated in a silicone bath (200° C) for 15 minutes. The evolved water amounted to 2.30 g; Theory, 2.33 g. A short path distillation of the viscous residue gave analytical III as a viscous, supercooled liquid which gradually crystallized: 37.7 g; 92.5% yield; bp 125°/0.3 mm Hg; mp 75° C. Anal. Calcd. for $C_{11}H_4F_6O_4$: C, 42.05; H, 1.28; F, 36.28. Found: C, 41.95; H, 1.22; F, 36.36.

It is contemplated that the preparation of the novel tetra-acid can be achieved as follows:

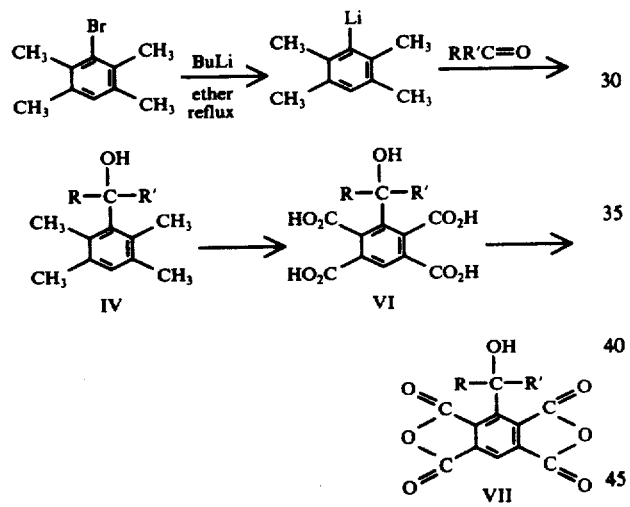

wherein R and R' are $CF_3$ or $C_2F_5$ or $C_3F_7$.

The method of preparing the novel tetra-acid precursors and the dianhydride curing agents which has been used is as follows:

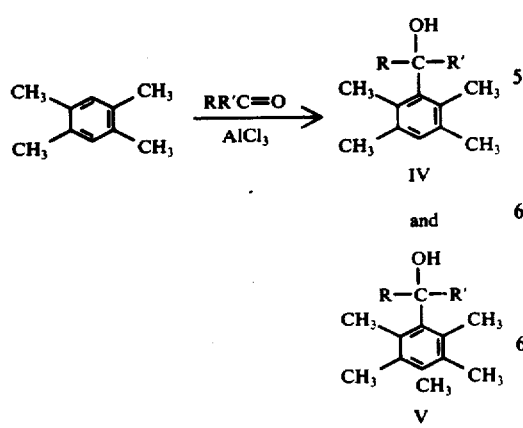

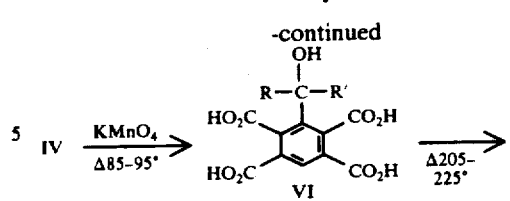

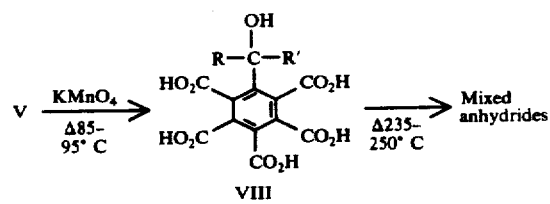

wherein R and R' are $CF_3$, $C_2F_5$, or $C_3F_7$.

The pentamethyl compound of the preceding process can also be used to prepared a useful precursor and curing agent. The curing agent is actually a mixture of anhydrides which are toluene soluble. A schematic of the preparation of these compounds is as follows:

wherein R and R' are $CF_3$, $C_2F_5$, or $C_3F_7$.

The following examples are presented as specific illustrations of the above methods. In these examples R and R' are $CF_3$. It is understood that the invention is not limited to these examples but is susceptible to different modifications that would be recognized by one of ordinary skill in the art.

EXAMPLE 4

2-Hydroxyhexafluoro-2-propyl durene, IV, and 2-Hydroxyhexafluoro-2-propyl pentamethylbenzene, V.

A 3-liter 3-necked flask was equipped with a magnetic stirrer, above-surface gas inlet tube, condenser (cooled with Dry-Ice-alcohol) and drying tube (Drierite). The flask was charged with 120 g durene (0.894 mole), carbon disulfide (1200 g) and aluminum chloride (9 g). Hexafluoroacetone was introduced as rapidly as possible as indicated by the reflux in the condenser (reaction temp. 20 ± 2). After 6 hours, 54 g (0.325 mole) of hexafluoroacetone had been consumed. Water (100 ml) was added. After the exotherm subsided, the resulting mixture was acidified (125 ml 2 N hydrochloric acid). The acidified mixture was strirred overnight and then filtered to remove small amounts of inorganic salts. The carbon disulfide layer was dried and the solvent evaporated to yield 166.7 g of liquid residue. The latter analyzed 57.9% unreacted durene, 23.3% IV, 7.4% pentamethylbenzene, 5.0% V, 0.8% hexamethylbenzene, together with 5.6% of unidentified higher boiling components. The resolution of this mixture by distillation posed problems because of the tendency of IV to codistill with pentamethylene benzene and for V to codistill with hexamethyl benzene. To obviate these difficulties, the mixture was first distilled from 2N sodium hydroxide solution (1500 ml). This procedure largely sup- -continued

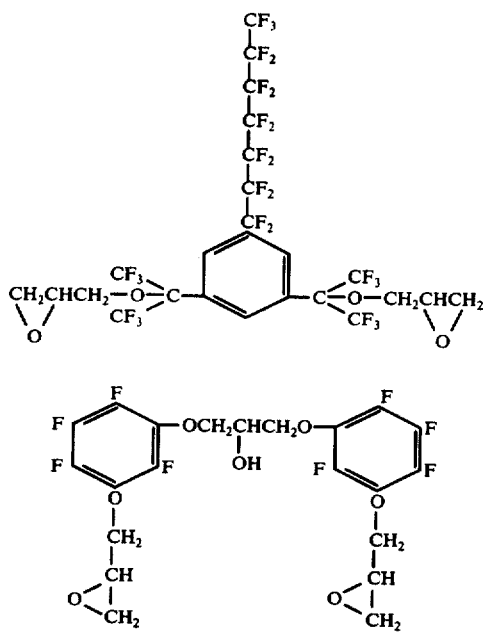

The curing agents of this invention react with highly fluorinated epoxies in a curing agent-to-epoxy equivalence from 0.5:1.0 to 1.3:1.0 with 0.85:1.0 to 1.0:1.0 equivalence preferred. It is preferred that the reaction is catalyzed. Any of the usual epoxy catalysts may be used. The type that is most frequently used is the tertiary amine and the most frequently used tertiary amine is dimethylbenzyl amine. For the practice of the present invention the preferred catalyst is dimethylbenzyl amine in an amount of from 0.3 to 3.0 weight percent of the total reactants weight. It is most preferred that the amount of catalyst is from 0.5 to 2.0 weight percent of the toal reactant weight for epoxy resins prepared from highly fluorinated diglycidyl ethers. To prepare a colorless fluorinated epoxy resin, a quaternary ammonia salt, e.g., cetyl trimethyl ammonium bromide or chloride, or triphenylphosphine is used as the catalyst. The reactants are reacted initially at a temperature from 45° to 55° until gelation and then reacted at a temperature from 80° to 100° C until the desired cure is obtained, generally in about 3 to 5 hours.

The reaction time is from 1 to 8 hours at a temperature from 110° to 135° C. For the diglycidyl ethers, the reaction time is from 1 to 5 hours at a temperature from 115° to 125° C with 120° C preferred with the amine catalysts.

The following examples are given as a specific illustration of a preparation of highly fluorinated epoxy resin from a hydride curing agent of this invention. It is understood that the invention is not limited by the examples.

EXAMPLE 9

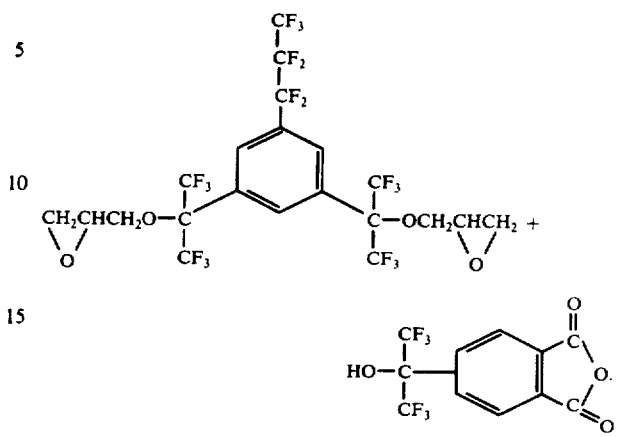

The reactants were reacted in a 1:1 equivalence at 120° C for 4 hours. Dimethylbenzyl amine in an amount of 2 weight percent of the total weight of reactants was used to catalyze the polymerization.

The resulting resin was a tough, rigid solid which had the appearance of a typical epoxy. A slight reddish-brown coloration developed during the reaction. The fluorine content of the resin was nearly 48%.

EXAMPLE 10

The reactants of Example 9 were reacted at 50° C until gelation. The reaction temperature was gradually increased to 90° C over a time span of 30 minutes. Heating was continued for three hours. Cetyl trimethyl ammonium bromide was used as the catalyst in an amount of 2 weight percent of the total weight of reactants.

The resulting resin was similar to the resin in Example 9 except that no color was present.

As the above examples show, effective curing agents for highly fluorinated epoxy resins are provided by the present invention. Resins which are transparent, have a higher thermal stability, and have a fluorine content of almost 50% are now possible. If hexafluoroacetone is used in the synthesis, the products are economically attractive because hexafluoroacetone is relatively cheap and is readily available commercialy.

In the specification, all temperatures, weights, and volumes are in units of degrees centigrade, grams, and milliliters.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A precursor of a curing agent for fluorinated epoxy resins selected from the class consisting of hydroxyperfluoroalkyl phthalic acid, hydroxyperfluoroalkyl pyromellitic acid, hydroxyperfluoroalkyl benzenepentacarboxylic acid, and mixtures thereof.

2. The precursor of claim 1 wherein said hydroxyperfluoroalkyl phthalic acid is 4-(2-hydrohexafluoro-2-propyl) phthalic acid said hydroxyperfluoroalkyl pyromellitic acid is 2-hydroxyhexa-fluoro-2-propyl pyromellitic acid, and said hydroxyperfluoroalkyl benzene-pentacarboxylic acid is 2-hydroxyhexafluoro-2-propyl benzene-pentacarboxylic acid.

presses the distillation of the caustic-soluble IV and V but permits the ready distillation and removal of the three caustic-insoluble aromatic hydrocarbons.

Acidification (300 ml 12N hydrochloric acid) of the alkaline residue precipitated an oil. Ether extraction of the oil, followed by distillation of the ether extract led to 30.0 g analytical IV; bp 78°/10 mm Hg; lit. (1), bp 220°–223°/760 mm Hg; yield, 28.7% based on hexafluoroacetone; Anal. calcd. for $C_{13}H_{14}F_6O$: C, 52.00, H, 4.70; F, 37.97; Found: C,51.92; H, 4.40; F, 37.73. Further distillation gave 10 g analytical V, bp 96°/10.0 mm Hg; mp, 38°–41°; yield, 9.8%; Anal. calcd. for $C_{14}H_{16}FO$; C, 53.50; H, 5.13; F, 36.27; Found: C, 53.63; H, 5.01; F, 36.34.

EXAMPLE 5

2-Hydroxyhexafluoro-2-propyl pyromellitic acid, VI.

A flask equipped with a stirrer, thermometer and condenser was charged with 12.0 g (0.40 mole) of IV, potassium permanganate (60.0 g; 0.38 mole), sodium hydroxide (16.0 g) and water (250 ml). The stirred mixture was heated to about 90° C and maintained at this temperature for 4 hours. The resulting mixture was filtered to remove precipitated manganese dioxide. The alkaline purple filtrate was acidified (150 ml 12N hydrochloric acid) and decolorized with sodium sulfite. The resulting white precipitate was collected, extracted with ether (400 ml), the ether extract concentrated leaving a residue of 14.5 g of white crystals mp 150°–160°. Recrystallization from .05 N hydrochloric acid (450 ml) led to 12.4 g of glistening white crystals of VI, mp 155°–160° on preheated cover glass; yield, 73.8%. Anal. calcd. for $C_{13}H_6F_6O_9$: C, 37.16; H, 1.44; F, 27.13. Found: C, 37.30, H, 1.51; F, 26.90.

EXAMPLE 6

2-Hydroxyhexafluoro-2-propyl pyromellitic anhydride, VII.

Sublimation of a 8.0 g of VI at 210°–215° C and 10.0 mm Hg leads to 6.65 g of VII; mp 125°–126°; yield, 90.1%; Anal. calcd. for $C_{13}H_2F_6O_7$: C, 40.65; H, 0.52; F, 29.68. Found: C, 40.74; H, 0.60; F, 29.42.

EXAMPLE 7

2-Hydroxyhexafluoro-2-propyl benzenepentacarboxylic acid, VIII.

A mixture of V (13.0 g, 0.041 mole), sodium hydroxide (26 g), potassium permanganate (65 g) and water (300 ml) was stirred and maintained at about 90° C for 4 hours. The cooled reaction mixture was filtered to remove manganese dioxide. The alkaline purple filtrate is acidified (120 ml 12N hydrochloric acid) and decolorized with sodium sulfite. The resulting white precipitate was collected, recrystallized from 4N hydrochloric acid (70 ml), and dried to furnish 12.0 g of analytical VIII; mp 217°–220°; Anal. calcd. for: $C_{14}H_6F_6O_{11}$; C, 36.22; H, 13.0, F, 24.56°, Found: C, 36.40; H, 1.40; F, 24.70.

EXAMPLE 8

Heating VIII (10 g) to 240°–245° (silicone bath) for 15 minutes leads to a mixture of unidentified anhydrides (8.2 g). The toluene-soluble fraction (7.3 g) (mp 204°–205°) is useful in curing fluoroepoxy resins.

Although the curing agents of the present invention are compatible and reactive with any fluorinated epoxy, the importance of these curing agents arise from their reactivity and compatibility with highly fluorinated diglycidyl ethers. Of particular importance are the diglycidyl ethers disclosed in U.S. Pat. No. 3,879,430 issued on patent application Ser. No. 397,207 filed on Sept. 13, 1973 Jacque G. O'Rear and James R. Griffith, in Griffith et al., *Fluorinated Epoxy Resins* in Chemtech. pg 311–16, May 1972, and in Griffith et al., *Fluorinated Network Polymers* in NRL Progress Report, pg. 15–27, December 1973. These disclosures are herein incorporated by reference.

The diglycidyl ethers which are most significant economically are:

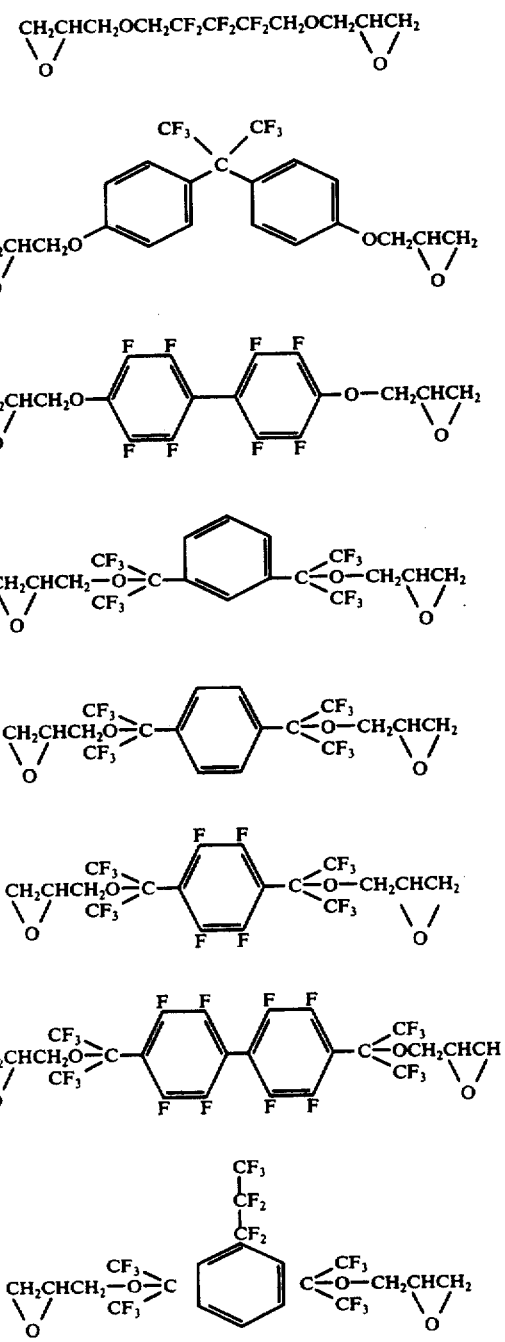

3. A curing agent for fluorinated epoxy resins selected from the class consisting of hydroxyperfluoroalkyl phthalic anhydride, hydroxyperfluoroalkyl pyromellitic dianhydride and mixtures thereof.

4. The curing agent of claim 3 wherein said hydroxyperfluoroalkyl phthalic anhydride is 4-(2-hydroxyhexafluoro-2-propyl) phthalic anhydride and said hydroxyperfluoroalkyl pyromellitic dianhydride is 2-hydroxyhexafluoro-2-propyl pyromellitic dianhydride.

5. A curing agent for fluorinated epoxy resins which is the toluene soluble portion of the product prepared by heating a hydroxyperfluoroalkyl benzenepentacarboxylic acid at a temperature from 235° to 250° C.

6. The curing agent of claim 5 wherein said hydroxyperfluoroalkyl benzene pentacarboxylic acid is 2-hydroxyhexafluoro-2-propyl benzene-pentacarboxylic acid and said reaction temperature is from 240° to 245° C.

7. The resinous copolymer of a fluorinated epoxy resin and a curing agent of claim 3.

8. The copolymer of claim 7 wherein the fluorinated epoxy resin is a fluorinated diglycidyl ether.

9. The resinous copolymer of a fluorinated epoxy resin and a curing agent of claim 5.

10. The copolymer of claim 9 wherein the fluorinated epoxy resin is a fluorinated diglycidyl ether.

* * * * *